Patented Apr. 7, 1942

2,278,537

UNITED STATES PATENT OFFICE 2,278,537

MANUFACTURE OF ALIPHATIC COMPOUNDS

Henry Dreyfus, London, and Leonard Fallows, Spondon, near Derby, England, assignors to Celanese Corporation of America, a corporation of Delaware No Drawing. Application October 6, 1938, Serial No. 233,584. In Great Britain October 19, 1937

15 Claims. (Cl. 260—547)

This invention relates to improvements in the thermal dehydration of aliphatic acids, and is more particularly concerned with the manufactupre of acetic anhydride or ketene by the thermal dehydration of acetic acid.

The general method of manufacturing acetic anhydride or ketene directly from acetic acid is to subject the acetic acid to thermal decomposition or dehydration, usually in the presence of suitable catalysts. While dehydration takes place over a wide range of temperature, the most useful range is generally 500–1000° C. and especially 600–900° C., though of course the optimum temperature naturally depends upon the particular conditions employed and notably upon the particular catalyst and the pressure or partial pressure of the acetic acid. U. S. Patent No. 1,735,962 describes catalysing the reaction by means of a phosphoric acid and indicates that the process may be carried out under reduced pressure or at ordinary pressure. Further, U. S. Patent No. 1,883,353 shows that it is advantageous to carry out the reaction in presence of bases, and in particular ammonia and the organic bases which are substitution products of ammonia, for example pyridine, piperidine, aniline, alkylanilines, toluidines and the like. Again in this patent it is indicated that it is preferable to employ atmospheric pressure or reduced pressure. The amount of the ammonia, pyridine or other base may, for example, be of the order of 1% based on the weight of the acetic acid subjected to thermal decomposition, or may be a smaller proportion. In the said patent it is indicated that the bases may be used in conjunction with the known catalysts for promoting the thermal decomposition of the acetic acid, and in particular it is stated that as catalyst there may be used the phosphates of the bases. Obviously instead of using phosphoric acid itself combined with the base, substances yielding phosphoric acid under the reaction conditions may be used.

The present invention is concerned with the thermal dehydration of acetic acid by processes of the type referred to in which phosphoric acid together with a volatile nitrogenous substance is employed as catalyst and according to the invention the volatile nitrogenous substance employed is a basic derivative of an amino carboxylic acid, and in particular of carbamic acid and of glycine. As examples of the volatile nitrogenous substances which may be employed may be mentioned urea, the urethanes (i. e. asters of carbamic acid), glycinamide, glycine glycine esters and the N-methyl, N-ethyl and other N-alkyl substitution products of these compounds. Acylated basic derivatives of the amino carboxylic acids may also be employed and in particular compounds containing the acyl radicle corresponding to the acid being dehydrated; for instance, in the thermal decomposition of acetic acid, acetyl derivatives of urea, urethane (ethyl carbamate), urethylane (methyl carbamate) and glycinamide may be employed. By the term "derivative" as used hereinafter in the claims it is intended to include only those compounds produced from the corresponding amino carboxylic acid by substitution óf the —OH group of the carboxyl radical, the —H thereof or also by aliphatic substitution of H in the amino group, such as are illustrated in the foregoing. The nitrogenous substances may be used in the form of phosphoric acid salts or in conjunction with phosphoric acid itself or substances yielding phosphoric acid under the reaction conditions.

In practice it is most convenient to vaporise acetic acid, subject it to preheating and pass it into the reaction zone in which the thermal dehydration takes place and to introduce the catalyst into the stream of superheated acetic acid vapour in the form of a solution.

The catalyst solution should be of such a concentration that the quantity to be introduced is quite small in relation to the quantity of acid subjected to thermal dehydration representing say about 5% of the weight of the acid. The solvent used for dissolving the catalyst may be varied to suit the particular catalyst employed but in general it is most convenient to use the acid to be subjected to thermal dehydration either in concentrated form or diluted with water, or water itself. The water, especially as it will be present in a comparatively small amount, will not exercise any deleterious effect upon the reaction since, as shown in U. S. Patent No. 1,735,-959 dilute acetic acid may quite readily be used for the thermal dehydration.

As indicated below, in the separation of the products of the thermal dehydration, benzene, toluene, xylene, chlorbenzene and the like may be employed to form an azeotropic mixture with the water resulting from the thermal dehydration or introduced into the acid feed so as to facilitate separation of acetic anhydride from the water and/or ketene. Such a liquid may likewise be used as a vehicle for the introduction of the catalyst.

The quantity of nitrogenous substance employed may, as previously indicated, be of the order of 1% of the weight of the acetic acid subjected to decomposition or may be less, e. g. 0.2 to 0.5%. Similarly the proportion of phosphoric acid or equivalent compound may be quite small and may be equivalent to the amount of the nitrogenous substance used.

Preferably the acetic acid vapour, before it is introduced into the reaction zone, is preheated to a temperature within 20–70° C. of the temperature at which the thermal dehydration is to be effected but, if desired, the vapour may only be heated to within say 100° C. of this temperature or may be heated right up to the temperature of the thermal dehydration. As previously indicated temperatures of 600–900° C. are especially suitable for the thermal dehydration; very good results are obtained at temperatures of from 650° to 750° C.

The reaction is best carried out at atmospheric pressure or at reduced pressure. Reduced pressure is of advantage where acetic anhydride is the desired product, and is also of somewhat greater advantage where ketene is desired. Generally, of course, a mixture of ketene and acetic anhydride is produced.

The acetic anhydride and/or ketene may be recovered from the reaction products in any suitable manner. For example, the reaction products may be cooled so as to condense the whole of the acetic anhydride, water and unchanged acetic acid and the ketene allowed to pass on, or the reaction products may be subjected to a fractionation treatment designed to separate the acetic anhydride from the water and ketene. In such a process it is of advantage to employ liquids such as benzene, toluene, xylene, chlorbenzene, chloroform and the like which form an azeotropic mixture with the water.

While the invention has been described above principally in relation to the thermal dehydration of acetic acid, it may be applied to the thermal dehydration of other aliphatic acids, for example propionic acid, butyric acid and the like.

The following example illustrates the process of the invention as applied to the thermal dehydration of acetic acid:

*Example*

Acetic acid is vaporised and the vapour is passed in a rapid stream first through a preheating tube maintained at a temperature of 600° to 650° C. and then through a reaction tube heated to 670° to 720° C. The reaction tube is provided at its inlet end with a Y-piece through one arm of which the superheated acetic acid vapour is introduced. The other arm of the Y-piece is closed and a narrow tube passes through the closure and projects just inside the arm. Through this tube, which is provided with a cooling jacket for some distance along its length beyond the arm of the Y-piece, is introduced an aqueous solution of phosphoric acid of 6–7% concentration containing besides phosphoric acid an equimolecular proportion of urea, the aqueous solution being introduced in a quantity equal to about 5% by weight of the acetic acid feed. Water is circulated through the cooling jacket to prevent decomposition and to minimise evaporation of the solution being introduced. The solution meets the superheated acetic acid vapour at the junction of the two arms of the Y-piece, is vaporised and passes with the acid vapour through the leg of the Y-piece into the zone in which the dehydration takes place.

Acetic anhydride is separated from the products issuing from the reaction tube by fractional condensation in presence of sufficient benzene to retain in the vapor phase the water present in the products, while gases remaining uncondensed after condensation of the water and benzene mixture remaining after the separation of the anhydride are washed with water or acetic acid to recover any ketene present.

Having described our invention what we desire to secure by Letters Patent is:

1. Process for the manufacture of chemical dehydration products of lower aliphatic acids, which comprises passing the vapor of the acid through a heated reaction zone and dispersing in the reaction zone in the gaseous phase phosphoric acid and a volatile basic carbonyl group-containing derivative of an amino-carboxylic acid.

2. Process for the manufacture of chemical dehydration products of acetic acid, which comprises passing acetic acid vapor through a heated reaction zone and dispersing in the reaction zone in the gaseous phase phosphoric acid and a volatile basic carbonyl group-containing derivative of an amino-carboxylic acid.

3. Process for the manufacture of chemical dehydration products of acetic acid, which comprises passing acetic acid vapor through a reaction zone heated to a temperature between 600 and 900° C. and dispersing in the reaction zone in the gaseous phase phosphoric acid and a volatile basic carbonyl group-containing derivative of an amino-carboxylic acid.

4. Process for the manufacture of chemical dehydration products of acetic acid, which comprises passing acetic acid vapor through a reaction zone heated to a temperature between 600 and 900° C. and dispersing in the reaction zone in the gaseous phase phosphoric acid and a volatile basic carbonyl group-containing derivative of glycine.

5. Process for the manufacture of chemical dehydration products of acetic acid, which comprising passing acetic acid vapor through a reaction zone heated to a temperature between 600 and 900° C. and dispersing in the reaction zone in the gaseous phase phosphoric acid and a volatile basic carbonyl group-containing derivative of carbamic acid.

6. Process for the manufacture of chemical dehydration products of acetic acid, which comprises passing acetic acid vapor through a reaction zone heated to a temperature between 600 and 900° C. and dispersing in the reaction zone in the gaseous phase phosphoric acid and urea.

7. Process for the manufacture of chemical dehydration products of lower aliphatic acids, which comprises passing the vapor of the acid through a heated reaction zone and simultaneously feeding into and dispersing in the reaction zone in the gaseous phase a liquid medium containing a substance selected from the group consisting of phosphoric acid and substances yielding phosphoric acid under the conditions in the reaction zone, and a volatile basic carbonyl group-containing derivative of an amino-carboxylic acid.

8. Process for the manufacture of chemical dehydration products of acetic acid, which comprises passing acetic acid vapor through a reaction zone heated to a temperature between 600 and 900° C., and simultaneously feeding into and dispersing in the reaction zone in the gaseous phase a liquid medium containing a substance selected from the group consisting of phosphoric acid and substances yielding phosphoric acid under the conditions in the reaction zone, and a volatile basic carbonyl group-containing derivative of an amino-carboxylic acid.

9. Process for the manufacture of chemical dehydration products of acetic acid, which comprises vaporizing acetic acid, preheating the vapors to at least 500° C., passing them through a reaction zone heated to a temperature at most 100° C. above the preheating temperature and lying between 600° and 900° C., and feeding into and dispersing in the reaction zone in the gaseous phase a liquid medium containing a substance selected from the group consisting of phosphoric acid and substances capable of yielding phosphoric acid under the conditions in the reaction zone, and a volatile basic carbonyl group-containing derivative of glycine.

10. Process for the manufacture of chemical dehydration products of acetic acid, which comprises vaporizing acetic acid, preheating the vapors to at least 500° C., passing them through a reaction zone heated to a temperature at most 100° C. above the preheating temperature and lying between 600° and 900° C., and feeding into and dispersing in the reaction zone in the gaseous phase a liquid medium containing a substance selected from the group consisting of phosphoric acid and substances capable of yielding phosphoric acid under the conditions in the reaction zone, and a volatile basic carbonyl group-containing derivative of carbamic acid.

11. Process for the manufacture of chemical dehydration products of acetic acid, which comprises vaporizing acetic acid, preheating the vapors to at least 500 C., passing them through a reaction zone heated to a temperature at most 100° C. above the preheating temperature and lying between 600° and 900° C., and feeding into and dispersing in the reaction zone in the gaseous phase a liquid medium containing a substance selected from the group consisting of phosphoric acid and substances capable of yielding phosphoric acid under the conditions in the reaction zone, and urea.

12. Process for the manufacture of chemical dehydration products of acetic acid, which comprises passing acetic acid vapor through a reaction zone heated to a temperature between 600 and 900° C. and simultaneously feeding into and dispersing in the reaction zone in the gaseous phase a liquid medium comprising water, a substance selected from the group consisting of phosphoric acid and substances yielding phosphoric acid under the conditions in the reaction zone, and a volatile basic carbonyl group-containing derivative of an amino-carboxylic acid.

13. Process for the manufacture of chemical dehydration products of acetic acid, which comprises passing acetic acid vapor through a reaction zone heated to a temperature between 600° and 900° C., and simultaneously feeding into and dispersing in the reaction zone in the gaseous phase a liquid medium comprising acetic acid a substance selected from the group consisting of phosphoric acid and substances yielding phosphoric acid under the conditions in the reaction zone, and a volatile basic carbonyl group-containing derivative of an amino-carboxylic acid.

14. Process for the manufacture of chemical dehydration products of lower aliphatic acids, which comprises passing the vapor of the acid through a heated reaction zone and dispersing in the reaction zone in the gaseous phase phosphoric acid and a volatile basic compound which is selected from the group consisting of esters and amides of amino carboxylic acids and N-alkyl and N-lower acyl substitution products of such esters and amides.

15. Process for the manufacture of chemical dehydration products of acetic acid, which comprises passing acetic acid vapor through a heated reaction zone and dispersing in the reaction zone in the gaseous phase phosphoric acid and a volatile basic compound which is selected from the group consisting of esters and amides of amino carboxylic acids and N-alkyl and N-lower acyl substitution products of such esters and amides.

HENRY DREYFUS.
LEONARD FALLOWS.